United States Patent
Smith et al.

(10) Patent No.: US 11,692,274 B2
(45) Date of Patent: Jul. 4, 2023

(54) ENVIRONMENTAL BARRIER COATING WITH OXYGEN-SCAVENGING PARTICLES HAVING BARRIER SHELL

(71) Applicant: United Technologies Corporation, Farmington, CT (US)

(72) Inventors: Kenneth David Smith, East Longmeadow, MA (US); Xia Tang, West Hartford, CT (US); Paul Sheedy, Bolton, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 616 days.

(21) Appl. No.: 16/704,186

(22) Filed: Dec. 5, 2019

(65) Prior Publication Data
US 2021/0172328 A1   Jun. 10, 2021

(51) Int. Cl.
*F01D 5/28* (2006.01)
*C23C 4/10* (2016.01)
(Continued)

(52) U.S. Cl.
CPC .............. *C23C 28/042* (2013.01); *B05D 1/02* (2013.01); *B05D 1/18* (2013.01); *B05D 3/0254* (2013.01);
(Continued)

(58) Field of Classification Search
CPC ..... C23C 30/00; C23C 30/005; C23C 28/042; C23C 4/10; C23C 4/11; C23C 4/04; C23C 4/067; C23C 4/123; C23C 4/129; C23C 4/134; C23C 4/137; C23C 24/00; C23C 24/02; C23C 24/04; C23C 24/08; C23C 24/085; C23C 26/00; C23C 28/04; C23C 28/02; C23C 28/027; C23C 28/34; C23C 28/3455; F01D 5/288; F01D 5/28; F01D 25/005; F05D 2220/32; B05D 1/02; B05D 1/18; B05D 2203/30; B05D 2202/00; B05D 2202/40; B05D 2202/30; B05D 2202/10; B05D 5/00; B05D 3/0254; Y10T 428/25;
(Continued)

(56) References Cited

U.S. PATENT DOCUMENTS 5,740,515 A   4/1998  Beele
6,254,975 B1  7/2001  Kayser et al.
(Continued)

FOREIGN PATENT DOCUMENTS

EP   3246431   11/2017
EP   3418420   12/2018

OTHER PUBLICATIONS

European Search Report for European Patent Application No. 20208674.0 completed Jan. 12, 2021.
(Continued)

*Primary Examiner* — Michael E. La Villa
(74) *Attorney, Agent, or Firm* — Carlson, Gaskey & Olds, P.C.

(57) ABSTRACT

A gas turbine engine article includes a substrate and an environmental barrier coating disposed on the substrate. The environmental barrier coating includes oxygen-scavenging particles. Each oxygen-scavenging particle includes a silicon-containing core particle encased in an oxygen barrier shell.

16 Claims, 2 Drawing Sheets

(51) Int. Cl.
C23C 28/04 (2006.01)
C23C 24/04 (2006.01)
C23C 24/08 (2006.01)
C23C 4/11 (2016.01)
C23C 24/00 (2006.01)
C23C 24/02 (2006.01)
C23C 4/067 (2016.01)
F01D 25/00 (2006.01)
C23C 30/00 (2006.01)
C23C 4/123 (2016.01)
C23C 4/134 (2016.01)
C23C 28/02 (2006.01)
C23C 28/00 (2006.01)
C23C 4/04 (2006.01)
C23C 4/129 (2016.01)
C23C 26/00 (2006.01)
C23C 4/137 (2016.01)
B05D 5/00 (2006.01)
B05D 3/02 (2006.01)
B05D 1/02 (2006.01)
B05D 1/18 (2006.01)

(52) U.S. Cl.
CPC ............... B05D 5/00 (2013.01); C23C 4/04 (2013.01); C23C 4/067 (2016.01); C23C 4/10 (2013.01); C23C 4/11 (2016.01); C23C 4/123 (2016.01); C23C 4/129 (2016.01); C23C 4/134 (2016.01); C23C 4/137 (2016.01); C23C 24/00 (2013.01); C23C 24/02 (2013.01); C23C 24/04 (2013.01); C23C 24/08 (2013.01); C23C 24/085 (2013.01); C23C 26/00 (2013.01); C23C 28/02 (2013.01); C23C 28/027 (2013.01); C23C 28/04 (2013.01); C23C 28/34 (2013.01); C23C 28/3455 (2013.01); C23C 30/00 (2013.01); C23C 30/005 (2013.01); F01D 5/28 (2013.01); F01D 5/288 (2013.01); F01D 25/005 (2013.01); B05D 2202/00 (2013.01); B05D 2202/10 (2013.01); B05D 2202/30 (2013.01); B05D 2202/40 (2013.01); B05D 2203/30 (2013.01); F05D 2220/32 (2013.01); Y10T 428/12014 (2015.01); Y10T 428/12028 (2015.01); Y10T 428/12063 (2015.01); Y10T 428/12097 (2015.01); Y10T 428/12104 (2015.01); Y10T 428/12111 (2015.01); Y10T 428/12146 (2015.01); Y10T 428/12181 (2015.01); Y10T 428/12576 (2015.01); Y10T 428/12583 (2015.01); Y10T 428/12597 (2015.01); Y10T 428/12604 (2015.01); Y10T 428/12611 (2015.01); Y10T 428/12618 (2015.01); Y10T 428/12674 (2015.01); Y10T 428/12944 (2015.01); Y10T 428/2495 (2015.01); Y10T 428/25 (2015.01); Y10T 428/256 (2015.01); Y10T 428/259 (2015.01)

(58) Field of Classification Search
CPC ..... Y10T 428/12576; Y10T 428/12583; Y10T 428/12597; Y10T 428/12604; Y10T 428/12611; Y10T 428/12618; Y10T 428/12028; Y10T 428/12063; Y10T 428/12014; Y10T 428/12099; Y10T 428/12104; Y10T 428/12111; Y10T 428/12146; Y10T 428/12181; Y10T 428/12674; Y10T 428/12944; Y10T 428/256; Y10T 428/259; Y10T 428/2495
See application file for complete search history.

(56) References Cited

U.S. PATENT DOCUMENTS

| | | |
|---|---|---|
| 6,265,080 B1 | 7/2001 | Maloney et al. |
| 6,436,480 B1 | 8/2002 | Upadhya |
| 7,179,505 B2 | 2/2007 | Yoon et al. |
| 7,622,150 B2 | 11/2009 | Zhao et al. |
| 9,611,181 B2 | 4/2017 | Tang et al. |
| 10,093,810 B2 | 10/2018 | Wan et al. |
| 10,308,818 B2 | 6/2019 | Tang et al. |
| 2007/0231595 A1 | 10/2007 | Tamaddoni-Jahromi et al. |
| 2017/0327937 A1* | 11/2017 | Smyth .................. C23C 4/134 |
| 2019/0119803 A1 | 4/2019 | Tang et al. |
| 2019/0292645 A1 | 9/2019 | Vassen et al. |

OTHER PUBLICATIONS

Carabat, A.L., van der Zwaag, S., and Sloof, W.G. (2015). Creating a protective shell for reactive MoSi2 particles in high-temperature ceramics. J. Am. Ceram. Soc. 98(8). pp. 2609-2616.

Meijerink, M.J. (2015). Coating of MoSi2 healing particles for self-healing thermal barrier coatings. Thesis. Delft University. Dec. 31, 2015. Retrieved from: https://repository.tudelft.nl/islandora/object/uuid:2aa55fd2-f440-4964-99fb-955567e72945?collection=education.

Perepezko, J.H. and Sakidja, R. (2009). Oxidation resistant coatings for ultrahigh temperature refractory Mo-base alloys. Advanced Engineering Materials. 11(11). 2009. pp. 892-897.

Perepezko, J.H. (2018). High temperature environmental resistant Mo—Si—B based coatings. International Journal of Refractory Metals & Hard Materials. 71. 2018. pp. 246-254.

Rioult, F.A., Imhoff, S.D., Sakidja, R. and Perepezko, J.H. (2009). Transient oxidation of Mo—Si—B alloys: Effect of the microstructure size scale. Acta Materialia. 57. 2009. pp. 4600-4613.

Ritt, P.J., Williams, P.A., Splinter, S.C., and Perepezko, J.H. (2014). Arc jet testing and evaluation of Mo—Si—B coated Mo and SiC—Zrb2 ceramics. Journal of the European Ceramic Society. 34. 2014. pp. 3521-3533.

* cited by examiner

ENVIRONMENTAL BARRIER COATING WITH OXYGEN-SCAVENGING PARTICLES HAVING BARRIER SHELL

BACKGROUND

Components in a gas turbine engine often include barrier coatings to protect the underlying component from the effects of the severe operating environment. Barrier coatings are available in numerous varieties, which can include thermal barrier coatings and environmental barrier coatings. Thermal barrier coatings are typically designed for maximizing thermal insulation of a component from the surrounding high-temperature environment. Environmental barrier coatings are typically designed for maximizing resistance of infiltration or attack by the environment.

SUMMARY

A gas turbine engine article according to an example of the present disclosure includes a substrate and an environmental barrier coating disposed on the substrate. The environmental barrier coating has oxygen-scavenging particles. Each oxygen-scavenging particle has a silicon-containing core particle encased in an oxygen barrier shell.

In a further embodiment of any of the foregoing embodiments, the silicon-containing core particle is a silicide of a metal selected from the group consisting of Mo, Nb, Zr, Hf, Ti, W, Y, Yb, Cr, V, Ta, Zn, Al—Si alloys and combinations thereof, and the oxygen barrier shell is a compound of the metal with an element selected from the group consisting of Si, B, C, O, Al, and combinations thereof.

In a further embodiment of any of the foregoing embodiments, the silicide is selected from the group consisting of $MoSi_2$, $Mo_5Si_3$, $NbSi_2$, $ZrSi_2$, $HfSi_2$, $TiSi_2$, $WSi_2$, $YSi_2$, $YbSi_2$, $CrSi_2$, $VSi_2$, $TaSi_2$, SiC, SiOC, SiCNO, SiAlON, and combinations thereof.

In a further embodiment of any of the foregoing embodiments, the oxygen barrier shell is a compound of a metal and an element. The metal is selected from the group consisting of Mo, Nb, Zr, Hf, Ti, W, Y, Yb, Cr, V, Ta, Zn, Al—Si alloys and combinations thereof, and the element is selected from the group consisting of Si, B, C, O, Al, and combinations thereof.

In a further embodiment of any of the foregoing embodiments, the oxygen barrier shell is Mo—Si—B.

In a further embodiment of any of the foregoing embodiments, the oxygen barrier shell is Mo—Si—B—Al—O.

In a further embodiment of any of the foregoing embodiments, the oxygen barrier shell is multi-layered.

In a further embodiment of any of the foregoing embodiments, the oxygen barrier shell includes layers selected from the group consisting of $Mo_5Si_3$, $Mo_5SiB_2$, $MoB_2$, $MoSi_2$, and combinations thereof.

In a further embodiment of any of the foregoing embodiments, the silicon-containing core particle defines a maximum particle dimension, and the oxygen barrier shell has a shell thickness that is from 0.2% to 40% of the maximum particle dimension.

In a further embodiment of any of the foregoing embodiments, the environmental barrier coating has a matrix. The matrix includes silica, and the oxygen-scavenging particles are dispersed through the matrix.

In a further embodiment of any of the foregoing embodiments, the silicon-containing core particle is a silicide of a metal selected from the group consisting of Mo, Nb, Zr, Hf, Ti, W, Y, Yb, Cr, V, Ta, Zn, Al—Si alloys and combinations thereof, and the oxygen barrier shell is a compound of the metal with an element selected from the group consisting of Si, B, C, O, Al, and combinations thereof.

In a further embodiment of any of the foregoing embodiments, the silicon-containing core particle is selected from the group consisting of silicon carbide, silicon oxycarbide, silicon oxycarbonitride, silicon aluminum oxynitride, and combinations thereof.

A method of fabricating a gas turbine engine article according to an example of the present disclosure includes providing a substrate and oxygen-scavenging particles. Each oxygen-scavenging particle includes a silicon-containing core particle encased in an oxygen barrier shell, and depositing the oxygen-scavenging particles on the substrate to form an environmental barrier coating.

In a further embodiment of any of the foregoing embodiments, the providing of the oxygen-scavenging particles includes forming the oxygen barrier shell on the silicon-containing core particle.

In a further embodiment of any of the foregoing embodiments, the depositing involves at least one of thermal spraying or slurry processing.

In a further embodiment of any of the foregoing embodiments, the depositing includes depositing a matrix that comprises silica, and the oxygen-scavenging particles are dispersed through the matrix.

In a further embodiment of any of the foregoing embodiments, the silicon-containing core particle is a silicide of a metal selected from the group consisting of Mo, Nb, Zr, Hf, Ti, W, Y, Yb, Cr, V, Ta, Zn, Al—Si alloys and combinations thereof, and the oxygen barrier shell is a compound of the metal with an element selected from the group consisting of Si, B, C, O, Al, and combinations thereof.

In a further embodiment of any of the foregoing embodiments, the oxygen barrier shell is multi-layered.

In a further embodiment of any of the foregoing embodiments, the silicon-containing core particle is selected from the group consisting of silicon carbide, silicon oxycarbide, silicon oxycarbonitride, silicon aluminum oxynitride, and combinations thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
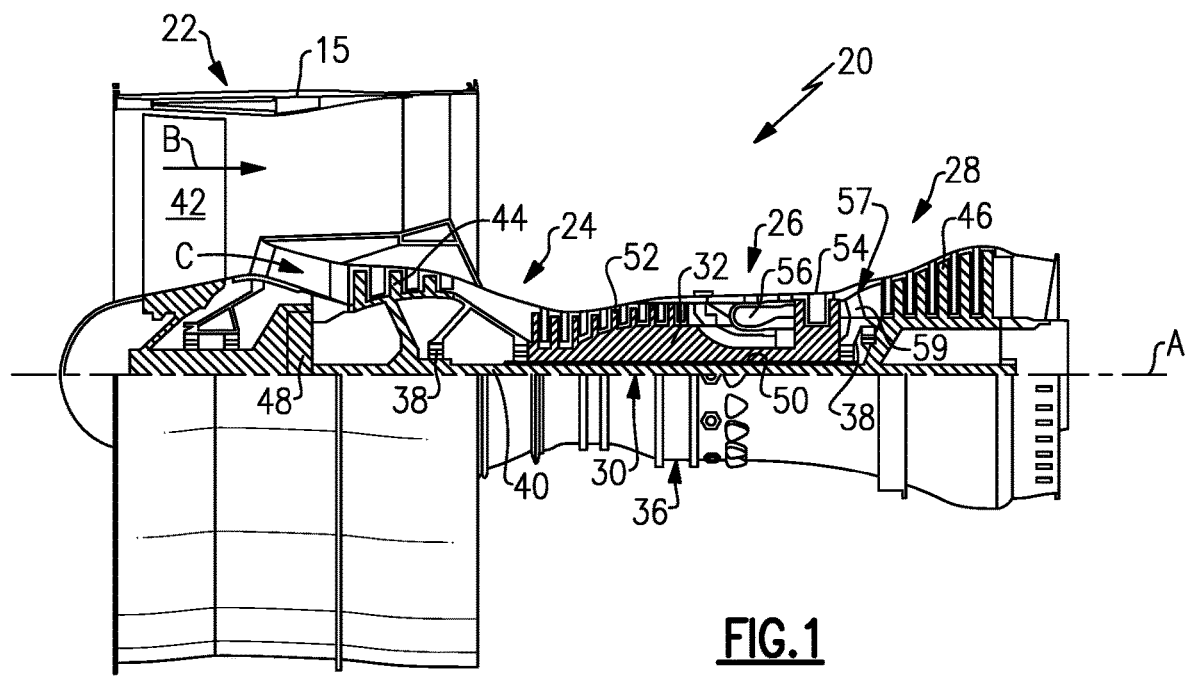
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^0.5$. The "Low corrected fan tip speed" as disclosed herein according to one non-limiting embodiment is less than about 1150 ft/second (350.5 meters/second).

Figure 2:
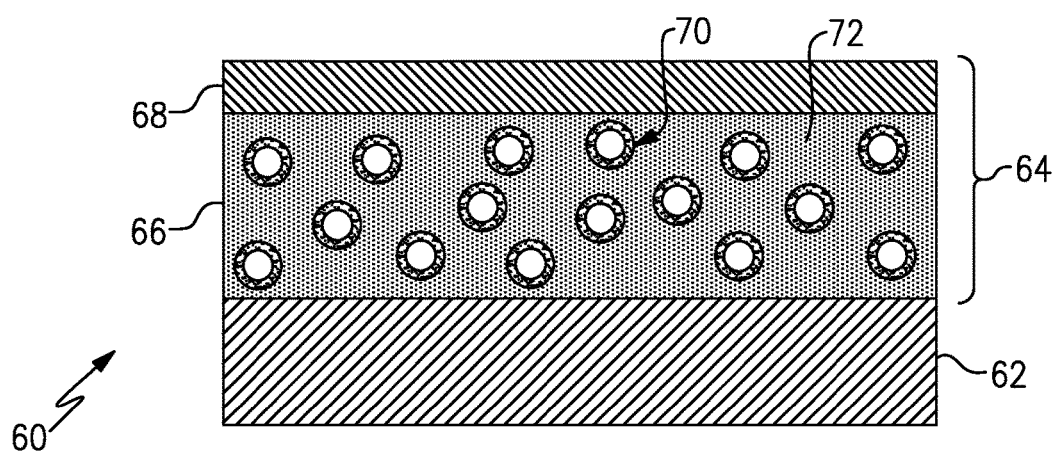
FIG. 2 illustrates an example article of the gas turbine engine.

FIG. 2 illustrates an example article 60 of the gas turbine engine 20. For example, although shown schematically, the article 60 may be a turbine blade, a turbine vane, a blade outer air seal, a combustor component, or other component that is subjected to high temperature gases in the engine 20.

The article 60 includes a substrate 62. For example, the substrate 62 is a high temperature metallic alloy or a ceramic material, such as a monolithic ceramic or a ceramic matrix composite ("CMC"). Example ceramic materials may include, but are not limited to, silicon-containing ceramics. The silicon-containing ceramic may be, but is not limited to, silicon carbide (SiC) or silicon nitride ($Si_3N_4$). An example CMC may be a SiC/SiC CMC in which SiC fibers are disposed within a SiC matrix. Example metallic alloys may include, but are not limited to, Ni based super alloys, Mo based alloys, Ta—W based alloys, alloys containing Mo, Ta, W, Ni, Ti, Al Hf, Zr, Nb, Si elements.

The material of the substrate 62 may be subject to degradation, such as oxidation and steam recession, in the high temperature combustion gases in the core flow path C. In this regard, the article 60 includes an environmental barrier coating 64 ("EBC 64") that is disposed on the substrate 62. Most typically, the EBC 64 is located on the exposed, gas path side of the substrate 62 in the core flow path C of the engine 20.

The EBC 64 may include multiple layers and materials that are designed, for example, to provide structural integrity and resistance to infiltration and/or attack by environmental substances. In the illustrated example, the EBC 64 includes, but is not limited to, an oxygen barrier layer 66 and a topcoat 68. In modified examples, the topcoat 68 may be a steam barrier or may be excluded and/or additional layers may be used. The topcoat 68 is not particularly limited and may include a composition that is selected from $HfO_2$, rare earth monosilicate ($RESiO_5$), $HfSiO_4$, $Y_2Si_2O_7$, $Yb_2Si_2O_7$, alkaline earth alumino-silicates ($AEAl_2Si_2O_8$) and combinations thereof. Rare earth elements include cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). Alkaline earth elements include magnesium (Mg), calcium (Ca), strontium (Sr), barium (Ba), and radium (Ra).

The oxygen barrier layer 66 includes oxygen-scavenging particles 70 ("particles 70"). The term "oxygen-scavenging" refers to material in which one or more compounds are reactive with oxygen under typical conditions in the engine 20 to limit oxygen from reaching the underlying substrate 62. In the illustrated example, the particles 70 are dispersed though a matrix 72 but may alternatively be used alone. For instance, the matrix 72 is composed of at least a predominant amount by volume percent of silica but may also include additional additives for further functionality of the oxygen barrier layer 66.

Figure 3:
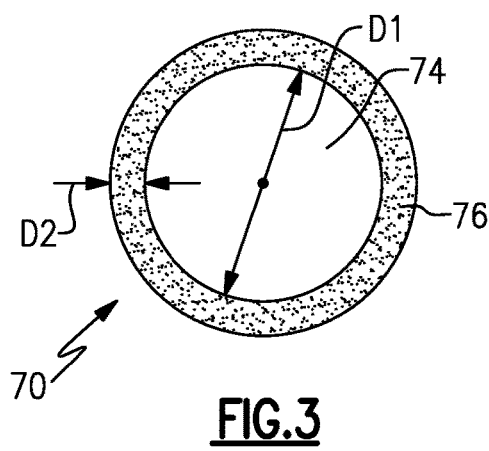
FIG. 3 illustrates an isolated view of an oxygen-scavenging particle.

FIG. 3 illustrates an isolated, sectioned view of a representative one of the particles 70. The particle 70 includes a silicon-containing core particle 74 that is encased in an oxygen barrier shell 76. The core particle 74 is composed of a silicon-containing material that serves as an oxygen scavenger in the oxygen barrier layer 66. For example, the silicon-containing material is a silicide, such as a rare earth silicide or a transition metal silicide. In examples, the silicide is a silicide of a metal selected from Mo, Nb, Zr, Hf, Ti, W, Al, Y, Yb, Cr, W, V, Ta, or Zn, or combinations thereof. For example, the silicides are selected from $MoSi_2$, $Mo_5Si_3$, $NbSi_2$, $ZrSi_2$, $HfSi_2$, $TiSi_2$. $WSi_2$, $YSi_2$, $YbSi_2$, $CrSi_2$, $VSi_2$, $TaSi_2$, alloys of Si with Al or other metals and combination thereof. Other examples of silicon-containing material includes silicon carbide (SiC), silicon oxycarbide (SiOC), silicon oxycarbonitride (SiCNO) and silicon aluminum oxynitride (SiAlON).

The silicon-containing material of the core particle 74 functions to capture oxygen that diffuses into the EBC 64, thereby limiting oxygen from reaching the underlying substrate 62. The silicon-containing material is functional for this purpose in the engine 20 at high continuous use temperatures of more than 1400° C. At such high temperatures the silicon-containing materials form an oxide scale. The scale slows oxidation and permits the silicon-containing material to provide a stable scavenging function in oxidative environments without undue oxidation. While many EBCs are designed to withstand high or maximum use temperatures, intermediate temperatures may ultimately be more detrimental to the silicon-containing materials. For instance, at temperatures in the vicinity of 500° C. to 1000° C., pesting occurs in which insufficient stable oxide scale is generated. The lack of stable oxide scale results in rapid oxidation of the oxygen scavenging materials, thereby reducing the scavenging functionality over time. The temperature range that pesting occurs varies with materials. Pesting occurs at 500° C.-700° C. for metal containing silicides or silicon-metal alloys, and 700° C.-1000° C. for silicon-containing material without metals. Boron can be mixed into an EBC and then diffused to the silicon-containing particles, however, this requires excessive amounts of boron that can debit other properties. As the engine 20 may spend considerable time at those intermediate temperatures at which pesting occurs, the oxygen barrier shell 76 serves to control oxygen diffusion into the core particle 74 over the intermediate temperatures. The particles 70 are thus engineered for enhanced durability over the full range of operational temperatures.

The oxygen barrier shell 76 is a material that includes the metal or combination of metals as in the core particle 74, in a compound with an element selected from Si, B, C, O, Al, or combinations thereof. Examples include, but are not limited to, Nb—Si—B, Nb—Si—B—O, Zr—Si—B, Zr—Si—B—O, Hf—Si—B, Hf—Si—B—O, Ti—Si—B, Ti—Si—B—O, Y—Si—B, Y—Si—B—O, Ta—Si—B, Ta—Si—B—O, $Al_2O_3$, and combinations thereof. In one example, the oxygen barrier shell 76 is selected from Mo—Si—B, Mo—Si—B—O, Mo—Si—B—Al—O, or combinations thereof for core particles containing Mo. For example, the oxygen barrier shell 76, such as the Mo—Si—B, may be in the form of layers or mixed phases. For Mo—Si—B, the phases are one or more of $Mo_5Si_3$, $Mo_3Si$ $Mo_5SiB_2$, MoB, $MoSi_2$, and/or Mo—Si—B alloy and the Mo—Si—B—O may be in the form of a Mo-containing borosilicate glass. Additionally, the oxygen barrier shell 76, such as the Mo—Si—B, Mo—Si—B—O, Mo—Si—B—Al—O, are self-healing. In the event that the oxygen barrier shell 76 is damaged, such as due to thermal stress, the oxygen barrier shell 76 can regenerate. For instance, for Mo—Si—B—Al—O, a Mo and Al containing borosilicate layer may develop below the shell 76 and provide barrier protection and healing capability. Core particles 74 containing other metals can also form metal-Si—B, metal-Si—B—O, or metal-Si—B—Al—O shell materials accordingly. The phases can include metal silicides, metal borides, metal containing borosilicate or alumino-borosilicate glasses.

The oxygen barrier shell 76 serves to limit oxygen diffusion over the intermediate temperatures of interest, yet also permit oxygen diffusion to the core particle 74 at higher or maximum use temperatures. In these regards, the oxygen barrier shell 76 should be thick enough to substantially limit oxygen diffusion at the intermediate temperatures but not so thick as to substantially prevent oxygen diffusion at higher temperatures. In general, useful thicknesses can be expressed in terms of the size of the core particle 74. For example, the core particle 74 defines a maximum particle dimension D1, and the oxygen barrier shell 76 has a shell thickness D2 that is from 0.2% to 40% of the maximum particle dimension D1, and in a further example from 0.2% to 10%. Most typically, the core particle 74 is substantially spherical and D1 is therefore the particle diameter. If the core particle 74 is oblong, D1 is the size in the long axis direction. In examples, within the percentages above, the dimension D1 is about 50 micrometers or less, and D2 is about 0.1 to 15 micrometers.

Figure 4:
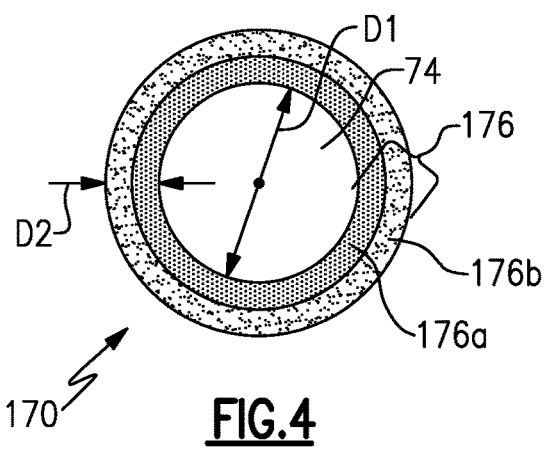
FIG. 4 illustrates another example of an oxygen-scavenging particle with a multi-layered shell.

FIG. 4 illustrates another example oxygen-scavenging particle 170. In this example, the particle 170 includes an oxygen barrier shell 176 that is multi-layered. In the illustrated example, the oxygen barrier shell 176 includes two layers 176a/176b. It is to be understood, however, that additional layers may be used. The layers 176a/176b (or additional layers, if used) are selected from $Mo_5Si_3$, $Mo_5SiB_2$, MoB, $MoSi_2$, $SiB_4$ and/or Mo—Si—B alloy, with at least one of the layers being a boron-containing layer. For example, each of these compounds has different ability with respect to self-healing, oxygen diffusion, and silicon diffusion. Therefore, the layers 176a/176b may be selected from among the noted compounds or other compounds in order to achieve a desired performance for self-healing and oxidation protection of the underlying core particle 74.

Figure 5:
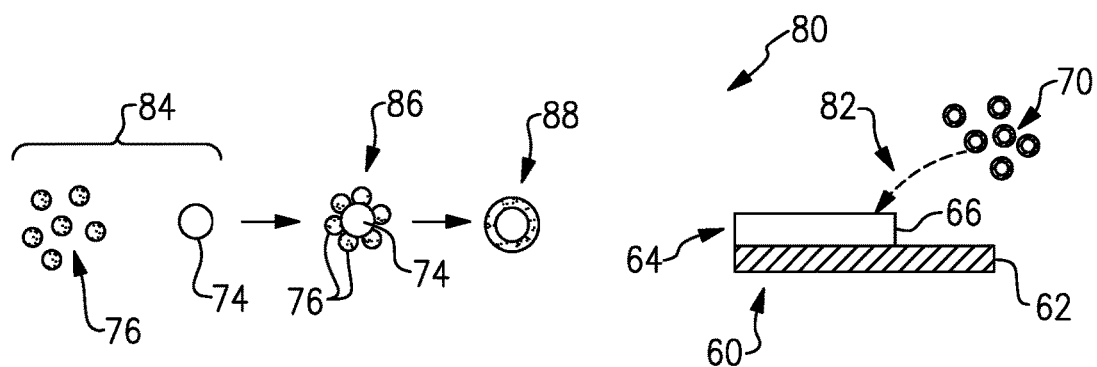
FIG. 5 illustrates a method of fabricating the article.

FIG. 5 illustrates a method 80 of fabricating the article 60. In general, as shown at 82, the method 80 includes providing the substrate 62 and the oxygen-scavenging particles 70 (or 170), and depositing the oxygen-scavenging particles 70 on the substrate to form the environmental barrier coating 64. As examples, the depositing of the oxygen-scavenging particles 70, and any matrix 72 material and additives, involves at least one of thermal spraying or slurry processing (e.g., via spraying, dipping, etc.).

The oxygen-scavenging particles 70 may be provided as pre-fabricated particles. Alternatively, the method 80 may also include fabricating the oxygen-scavenging particles 70. For instance, as shown at 84, starting core particles 74 (one shown) and one or more shell materials 76 are provided. For instance, the core particles 74 and shell materials 76 are provided as starting powders. The shell material 76 may be one or more precursors for the final oxygen barrier shell 76. As shown at 86, the shell material 76 is attached onto the exterior surface of the core particle 74. For example, the shell material 76 can be attached on the core particle 74 by mechanical mixing, acoustic mixing, spray drying, vapor deposition methods, or wet chemical techniques. As shown at 88, the shell material 76 is then consolidated around the core particle 74. For example, the consolidating includes thermal processing. In one example, the core particle is $MoSi_2$. A boron precursor shell material is then deposited by vapor deposition onto the core particle. The thermal processing is conducted in a non-oxidizing environment to cause a reaction between the $MoSi_2$ and the B to form $Mo_5Si_3$, $Mo_5SiB_2$, MoB, $MoSi_2$, $SiB_4$ and/or Mo—Si—B alloy. The amount and/or thickness of the boron precursor may be controlled in order to control formation of $Mo_5Si_3$, $Mo_5SiB_2$, MoB, $MoSi_2$, $SiB_4$ and/or Mo—Si—B alloy. The formation of various phases are also dependent on temperature and duration of heat treatment. Heat treatment at 1400° C.-1600° C. for 2-24 hours are required to form boron containing phases. For an oxygen barrier shell 76 formed of $Al_2O_3$, the $Al_2O_3$ may be fabricated by sol-gel processing.

In one example, particles of boron carbide ($B_4C$) or mixed particles of boron carbide ($B_4C$) and aluminum oxide ($Al_2O_3$) were attached onto core particles of $MoSi_2$ by acoustic mixing. The resulting core particles with attached boron carbide were then thermally processed in an oxidizing environment at a temperature of 700° C. to 1200° C. for 1 hour to 50 hours, for example 1000° C. for 10 hours. The thermal treatment converted the boron carbide and aluminum oxide into a relatively uniform shell layer of glassy Mo—Si—B—O or Mo—Si—B—Al—O around the core particle.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine article comprising:
a substrate; and
an environmental barrier coating disposed on the substrate, the environmental barrier coating including oxygen-scavenging particles, each said oxygen-scavenging particle including a silicon-containing core particle encased in an oxygen barrier shell, wherein the silicon-containing core particle is a silicide of a first metal selected from the group consisting of Mo, Nb, Zr, Hf, Ti, W, Y, Yb, Cr, V, Ta, Zn, and combinations thereof, the oxygen barrier shell includes a shell layer of a compound of a second metal, B (boron), and an element selected from the group consisting of Si, C, O, Al, and combinations thereof, and the second metal is the same as the first metal.

2. The article as recited in claim 1, wherein the silicide is selected from the group consisting of $MoSi_2$, $Mo_5Si_3$, $NbSi_2$, $ZrSi_2$, $HfSi_2$, $TiSi_2$, $WSi_2$, $YSi_2$, $YbSi_2$, $CrSi_2$, $VSi_2$, $TaSi_2$, and combinations thereof.

3. The article as recited in claim 1, wherein the first metal and the second metal are Mo, and the compound of the oxygen barrier shell is Mo—Si—B.

4. The article as recited in claim 1, wherein the first metal and the second metal are Mo, and the compound of the oxygen barrier shell is Mo—Si—B—Al—O.

5. The article as recited in claim 1, wherein the oxygen barrier shell is multi-layered such that the oxygen barrier shell includes the shell layer and at least one additional shell layer.

6. The article as recited in claim 5, wherein the at least one additional shell layer is selected from the group consisting of $Mo_5Si_3$, $Mo_5SiB_2$, $MoB_2$, $MoSi_2$, and combinations thereof.

7. The article as recited in claim 1, wherein the silicon-containing core particle of the oxygen-scavenging particle defines a maximum particle dimension, and the oxygen barrier shell of the oxygen-scavenging particle has a shell thickness that is from 0.2% to 40% of the maximum particle dimension.

8. The article as recited in claim 1, wherein the environmental barrier coating includes a matrix, the matrix comprises silica, and the oxygen-scavenging particles are dispersed through the matrix.

9. The article as recited in claim 1, wherein the first metal and the second metal are molybdenum.

10. A gas turbine engine article comprising:
a substrate; and
an environmental barrier coating disposed on the substrate, the environmental barrier coating including oxygen-scavenging particles, each said oxygen-scavenging particle including a silicon-containing core particle encased in an oxygen barrier shell, wherein the silicon-containing core particle is selected from the group consisting of silicon carbide, silicon oxycarbide, silicon oxycarbonitride, silicon aluminum oxynitride, and combinations thereof, the oxygen barrier shell includes a shell layer of a compound of a metal selected from a group consisting of Mo, Nb, Zr, Hf, Ti, W, Y, Yb, Cr, V, Ta, Zn, and combinations thereof with B (boron) and an element selected from the group consisting of Si, C, O, Al, and combinations thereof.

11. The article as recited in claim 10, wherein the metal is Mo and the element is selected from the group consisting of Si, O, Al, and combinations thereof.

12. A method of fabricating a gas turbine engine article, the method comprising:
providing a substrate and oxygen-scavenging particles, wherein each said oxygen-scavenging particle includes a silicon-containing core particle encased in an oxygen barrier shell, the silicon-containing core particle is a silicide of a first metal selected from the group consisting of Mo, Nb, Zr, Hf, Ti, W, Yb, Cr, V, Ta, Zn, and combinations thereof, the oxygen barrier shell includes a shell layer of a compound of a second metal, B (boron), and an element selected from the group consisting of Si, C, O, Al, and combinations thereof, and the second metal is the same as the first metal; and
depositing the oxygen-scavenging particles on the substrate to form an environmental barrier coating.

13. The method as recited in claim 12, wherein the providing of the oxygen-scavenging particles includes forming the oxygen barrier shell on the silicon-containing core particle.

14. The method as recited in claim 12, wherein the depositing involves at least one of thermal spraying or slurry processing.

15. The method as recited in claim 12, wherein the depositing includes depositing a matrix that comprises silica, and the oxygen-scavenging particles are dispersed through the matrix.

16. The method as recited in claim 12, wherein the oxygen barrier shell is multi-layered such that the oxygen barrier shell includes the shell layer and at least one additional shell layer.

* * * * *